Feb. 15, 1927. 1,617,770
E. SCHRÖDER
ELECTRODE OPERATING MEANS FOR WELDING MACHINES
Filed Sept. 2, 1921
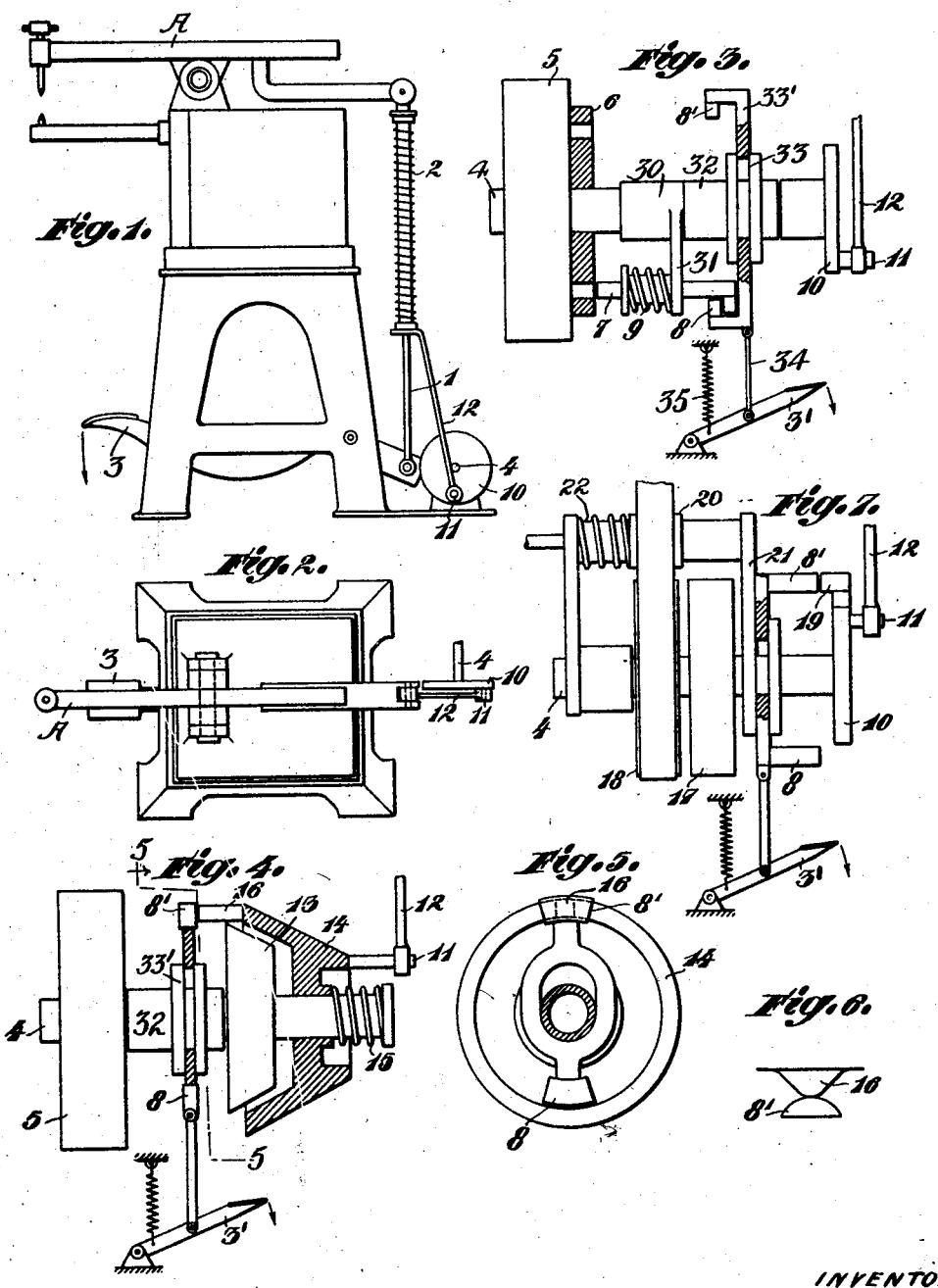
INVENTOR.
Edmund Schroeder.
By William C. Linton
Atty.

Patented Feb. 15, 1927.

1,617,770

UNITED STATES PATENT OFFICE.

EDMUND SCHRÖDER, OF BERLIN, GERMANY, ASSIGNOR TO THE FIRM BRAUN-BRÜNING & CO., OF BASEL, SWITZERLAND.

ELECTRODE-OPERATING MEANS FOR WELDING MACHINES.

Application filed September 2, 1921, Serial No. 497,979, and in Germany December 3, 1919.

This invention relates to starting devices for welding machines, said device being of simple construction, is efficient in operation, the same requiring but little attendance and adjustment, and will permit the operator to vary at will the duration of the welding operation.

I will explain the invention with reference to the accompanying drawings which illustrate several practical embodiments thereof, to enable others to adopt and use the same, and will summarize in the claims the novel features of construction, and novel combinations of parts, for which protection is desired.

In the drawings:

Fig. 1 is an elevation showing the link movement of a welding apparatus embodying my invention.

Figure 2 is a plan view of the welding machine as illustrated in Figure 1;

Figures 3 and 4 are enlarged sectional views of the starting device illustrating slight modifications which are to be applied to welding machines of the character shown in Figure 1;

Figure 5 is a detailed sectional view taken on the line 5—5 of Figure 4;

Figure 6 is a detailed plan view of the clutch releasing cam as illustrated in Figure 4; and, Figure 7 shows another slightly modified form of starting device to be used in connection with such welding machines, being a side elevation thereof with portions in section.

Referring now to the drawings wherein corresponding parts are designated by similar characters throughout the several views, I have, in Figure 1, illustrated an ordinary welding machine comprising the usual support and a stationary electrode as well as a movable electrode supported thereon. A pressure rod 1 is connected to this movable electrode A of the welding machine and the lower end of this rod 1 is connected to a foot pedal 3, which latter is pivotally supported upon the frame work of the welding machine. When this foot pedal 3 has been depressed, the movable electrode will be caused to travel towards the stationary electrode and when additional pressure is applied to this movable electrode, the welding contact will be completed. In order to obtain this additional pressure upon the movable electrode wherein the welding contact will be completed, I employ a starting device embodying the present invention which consists of the disc 10 secured to a continuously revolving shaft 4. Eccentrically connected to this disc 10, as at 11, is a push rod 12 and one end of this push rod 12 is perforated to receive the pressure rod 1. A coiled spring 2 is employed between this pressure rod 1 and the push rod 12. From this construction, it is obvious that upon the rotation of the shaft 4, a reciprocating motion will be transmitted to the push rod 12 which in turn will effect vertical movement of the movable electrode. When the foot pedal 3 has been depressed, the pressure transmitted to the movable electrode from the revolving shaft 4 through the mechanism as described, will cause a welding contact to be made as the electrodes will be closely adjacent one another. From this, it will be noted that this complete welding pressure is applied to the movable electrode spasmodically only upon each revolution of the shaft 4 and when it is desired to have the electrodes in their welding contact positions for a desired period of time, the starting devices as illustrated in Figures 3 to 7 of the drawings are employed.

The starting device as illustrated in Figure 3 of the drawings discloses a belt pulley 5 loosely mounted upon the shaft 4 and of course, it is to be understood that this belt pulley 5 is rotated through a suitable source of power. This shaft 4 is the same as the one described in Figures 1 and 2 of the drawings and has connected to an end opposite to which the pulley 5 is connected, the disc 10, which latter is also connected to the push rod 12. Fixedly secured to the pulley 5 is a perforated disc 6 and the perforations thereof consist of two in number, which are arranged diametrically opposite. Keyed to the shaft 4 is a sleeve 30 having as arm 31 extending therefrom and the outer end of this arm 31 has slidably mounted therein a pin 7. A coiled spring 9 is employed for applying pressure to this pin 7 whereby it will be held in contact with the disc 6 and upon rotation of the shaft 4, it will be caused to enter one of the perforations of this disc. One of the stationary bearings 32 for the shaft 4 is provided with a guide way 33 in which is adapted to slide a vertically movable plate 33'. Connected to the lower end of this plate 33' is a link 34 and this link 34 is connected to a foot pedal 3'. This foot pedal 3' is pivotally connected to a suitably mounted support and has also connected thereto a coiled spring 35 which normally holds the foot pedal 3' in the position as is illustrated in Figure 3. Projecting from one face of this slide plate 33' are the upper and lower cams 8' and 8 respectively which are adapted to project within the path of travel of the hooked end of the pin 7, whereby this pin will be retracted and disengaged from the perforated disc 6. In Figure 3 of the drawings, this pin 7 has been retracted or disconnected from the disc 6 as its hooked end is engaged by the cam 8, but upon applying pressure to the foot pedal 3', causing the same to move downwardly in the direction of the arrow, as shown, the pin 7 will be released, and the pressure exerted thereto by the coiled spring 9 will cause the pin to come into contact with the disc 6. As the pulley 5 is continuously rotated and the disc 6 carried thereby, the pin 7 will engage one of the perforations of the disc, at which time, the pin 7 will be carried with the disc and in turn, will cause the shaft 4 to rotate therewith. Should pressure be retained upon the foot pedal 3', the hooked end of the pin 7 upon one-half revolution of the shaft 4 will engage the cam 8' and again be retracted from engagement with the disc 6 whereby the shaft 4 will be held against rotation and the push rod 12 retained in its uppermost position. When this push rod 12 is in its uppermost position, pressure will be applied to the movable electrode, and as long as the operator applies pressure to the foot pedal 3, the welding contact between the electrodes will be retained. When the pressure is released from the pedal 3', the coiled spring 35 will pull the same and the plate 33 upwardly, whereby the hooked end of the pin 7 will be released from the cam 8' and the shaft 4 permitted to make another one-half revolution until it again assumes the position as shown in Figure 3, at which time, pressure to the rod 1 through the medium of the push rod 12 is released. The shaft 4, of course, revolves within the stationary bearing 32, whereas the sleeve 30 is keyed to this shaft 4 and carries the arm 31, which latter supports the key pin 7.

In Figures 4 and 5 of the drawings, I have illustrated a slightly modified form of my starting device wherein a cone clutch is employed for operatively connecting the push rod 12 to the shaft 4. The inner cone 13 is keyed to the shaft 4, whereas the outer cone 14 is loosely mounted upon the shaft 4 and has eccentrically connected thereto, as at 11, the push rod 12. A coiled spring 15 is carried by the shaft 4 and normally tends to hold the members 13 and 14 of the cone clutch together so that upon rotation of the shaft 4 by means of the power transmitting pulley 5, a reciprocating motion will be transmitted to the push rod 12. The outer cone 13 is provided with a projecting cam 16, which latter is adapted to contact with the cams 8 and 8' carried by the slidable plate 33'. This slidable plate 33' is adapted to move in a guide way carried by the stationary bearing 32, which latter supports the shaft 4. This plate 33' is also connected to the foot pedal 3', which is the same as the foot pedal shown in Figure 3 of the drawings. When the cam 16 is in contact with the cam 8', the clutch members will be disengaged, whereby the push rod 12 will be retained in its elevated position, but should pressure be applied to the foot pedal 3', the cam 16 will be released, whereby the pressure of the spring 15 will cause the clutch members to engage, and the outer clutch member 14 will revolve. Should the foot pedal 3' be retained in its lower position, the cam 16 will engage the cam 8 and thereby again disconnect the clutch members, whereby the push rod 12 will be retained in its lowermost position. When the pressure upon the foot pedal 3' has again been released, the clutch members will again engage whereby the push rod 12 will be elevated and assume the position as illustrated in Figure 4. In Figure 6 of the drawings, a plan view of the cams 8' and 16 is shown, when the cams are in contact with one another.

In Figure 7 of the drawings, another slightly modified form of my improved starting device has been illustrated, showing the use of belt transmission. The shaft 4 carries a fixed and a loose belt pulley 17 and 18 respectively, and at its front end this shaft has keyed thereto the crank disc 10 carrying the push rod 12. A belt fork 20 is supported upon a frame 21, which latter is movable longitudinally upon the shaft 4. A coiled spring 22 is also employed, which applies a constant pressure to the fork 20 whereby the belt will be normally held upon the fixed pulley 17. This support 21 forms a suitable guide for a plate having the cams 8 and 8' mounted thereon and this plate is connected to the foot pedal 3'. A suitable cam or projection 19 is also carried by the disc 10 so that when it contacts with either the cam 8 or 8', it will force the frame 21 in one direction whereby the form 20 will cause the belt to move to the loose pulley 18. As is shown in this figure of the drawing, the belt is connected to the loose pulley 18, due to the fact that the cam 19 of the disc 10 is in contact with the cam 8' and when in this position, the push rod 12 will remain in an elevated position as is shown. Should pressure be applied to the foot pedal 3' in the direction of the arrow, as shown, the cam 8' will be moved out of the path of travel of the cam 19 whereby the coiled spring 22 will exert a pressure upon the fork 20, which in turn will carry the belt to the fixed pulley 17. At this time, the shaft 4 will revolve until the cam 19 strikes one of the cams 8 or 8'. Should the foot pedal 3' be retained in its lower position, the cam 19 will strike the cam 8 whereby the push rod 12 will be retained in its lowermost position. When this foot pedal 3' has been again released, the shaft 4 will again rotate, whereby the push rod 12 will be elevated in the position as illustrated.

Whereas I have illustrated a lever 3 for retaining the electrodes in welding contact and a lever 3' for actuating the starting devices, it is, of course, to be understood that these levers or foot pedals 3 and 3' may be connected jointly by any suitable means which comes within the scope of the present invention. It will also be understood that the sliding elements of these starting devices may be moved by a slight tip on the foot pedal 3', and as the power required by the operator is very small the operation of the heaviest welding machine becomes easy.

The advantages of my new starting device for welding machines are that it is of solid and durable structure, requires but little attendance, and requires no great skill for the operation thereof.

I claim:

1. An electric welding machine comprising in combination a stationary and a movable electrode, a pressure rod connected to said movable electrode, a driven shaft, a disc carried by said shaft, a push rod operatively connecting said disc with said pressure rod whereby a reciprocal motion will be transmitted to the latter, and a foot lever connecting to the lower end of said pressure rod for placing said movable electrode in welding position.

2. In an electric welding machine, movable and immovable electrodes, a motion imparting connection to said movable electrode, means for transforming a rotary motion to a reciprocal motion connected to said motion imparting connection, a driven element secured to said transforming means, a drive shaft, a clutch element carried by said drive shaft, a clutch element carried by and rotatable with said driven element adapted to engage the clutch element of said drive shaft for effecting a driving connection between said drive shaft and transforming means, a slidable member adapted at times to engage the clutch element of said driven element for disengaging the driving connection between said drive shaft and transforming means, manually operable means connected to said slidable member, and manually operable means connected to said motion imparting means for placing said movable electrode in welding position.

3. In an electric welding machine, movable and immovable electrodes, a motion imparting connection to said movable electrode, a push rod included in said motion imparting connection, means for transforming a rotary motion to a reciprocal motion connected to said motion imparting connection, a driving means for said transforming means, a clutch element movable with and on said driving means, a cooperating clutch element secured to said transforming means and adapted to be engaged by said first clutch element, a semi-circular actuating cam carried by said driving means adapted to effect a driving connection between said clutch elements whereby to transmit rotary motion to said transforming means for a predetermined period whereby to effect a single rotation of the latter, and manually operable means connected to the lower end of said push rod for directing a further movement to said motion imparting connection and place the movable electrode in welding position.

In witness whereof I have hereunto subscribed my name.

EDMUND SCHRÖDER.